United States Patent [19]

McParland

[11] Patent Number: 5,201,118
[45] Date of Patent: Apr. 13, 1993

[54] PROCESS FOR REPAIRING HEAT-EXCHANGER TUBES

[76] Inventor: Kevin W. McParland, 3115 Redding Rd., Fairfield, Conn. 06430

[21] Appl. No.: 848,156

[22] Filed: Mar. 9, 1992

[51] Int. Cl.$^5$ .............................................. B23P 15/26
[52] U.S. Cl. ........................... 29/890.031; 29/890.013; 29/402.16; 29/723; 29/727
[58] Field of Search .................... 29/890.031, 726, 727, 29/723, 890.043, 402.16, 523

[56] References Cited

U.S. PATENT DOCUMENTS

| | | | |
|---|---|---|---|
| 1,937,600 | 12/1933 | Spanyol | 285/46 |
| 2,092,358 | 9/1937 | Robertson | 285/56 |
| 2,157,107 | 5/1939 | Bay | 285/54 |
| 3,132,062 | 5/1964 | Lang et al. | 156/287 |
| 3,317,222 | 5/1967 | Maretzo | 285/55 |
| 3,781,966 | 1/1974 | Lieberman | 29/401 |
| 3,962,767 | 6/1976 | Byerly et al. | 29/157 |
| 4,505,017 | 3/1985 | Schukei | 29/157 |
| 4,527,322 | 7/1985 | Jackson | 29/402.06 |
| 4,571,821 | 2/1986 | Pirl et al. | 29/890.031 |
| 4,637,436 | 1/1987 | Stewart et al. | 138/89 |
| 4,685,186 | 8/1987 | Glatthorn | 29/890.031 |
| 4,694,549 | 9/1987 | Rabe et al. | 29/157 |
| 4,918,808 | 4/1990 | Cartry et al. | 29/727 |
| 4,922,605 | 5/1990 | Cartry et al. | 29/890.031 |
| 4,937,933 | 7/1990 | Dietrich | 29/890.031 |
| 4,941,512 | 7/1990 | McParland | 138/97 |
| 5,008,996 | 4/1991 | Bonnand et al. | 29/890.031 |

FOREIGN PATENT DOCUMENTS

| | | | |
|---|---|---|---|
| 2529109 | 12/1983 | France | 29/890.031 |
| 2223559 | 4/1990 | United Kingdom . | |
| 2225406 | 5/1990 | United Kingdom . | |
| 2227543 | 8/1990 | United Kingdom . | |

Primary Examiner—Irene Cuda
Attorney, Agent, or Firm—H. Gibner Lehmann; K. Gibner Lehmann

[57] ABSTRACT

A method and apparatus for repairing a heat-exchanger of the type having a tube sheet in which the extremities of exchanger tubes are mounted. The method involves unrolling tubular insert stock from a supply roll, straightening the unrolled insert stock by passing it through a straightening device which has its output disposed substantially in alignment with one of the exchanger tubes to be repaired and at a location adjacent the mounted extremity of the exchanger tube, and forcibly pulling the straightened insert stock into the one exchanger tube. The pulled-in insert stock is then cut to length, and the ends radially expanded against the inner walls of the exchanger tube, and sealed to the tube sheet. The straightening is accomplished by a fixture having positioning pins receivable in adjacent ones of the heat exchanger tubes, such that the fixture can be manually positioned and thereafter held in place by the frictional engagement of the pins while the insert stock is being installed in the exchanger tube being repaired.

18 Claims, 3 Drawing Sheets

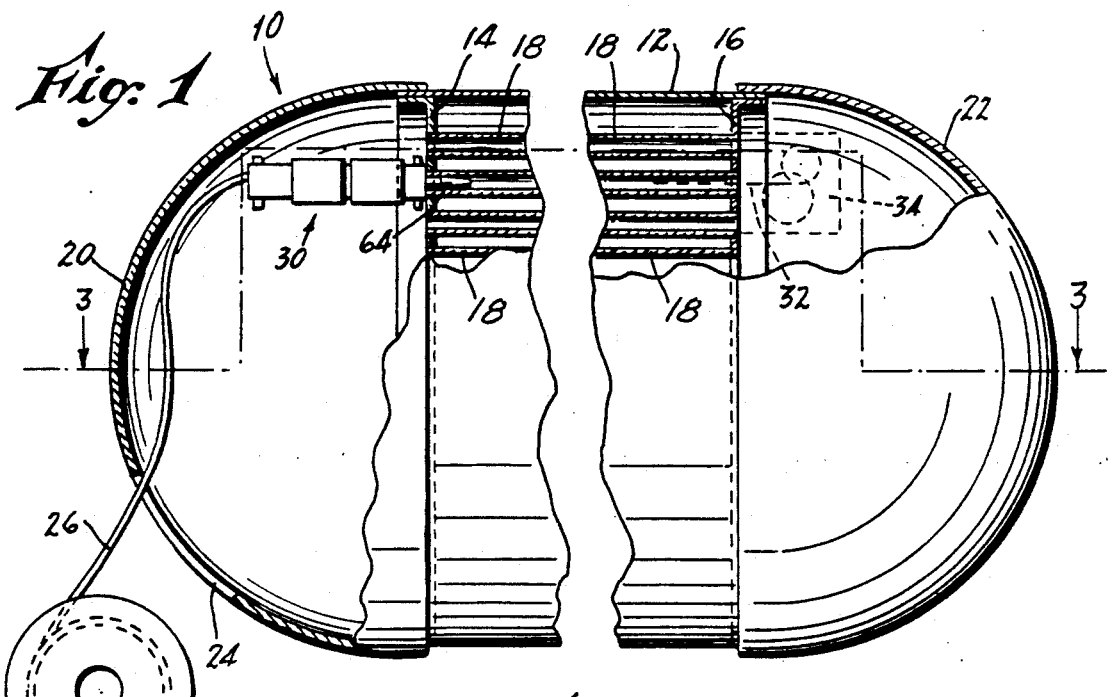
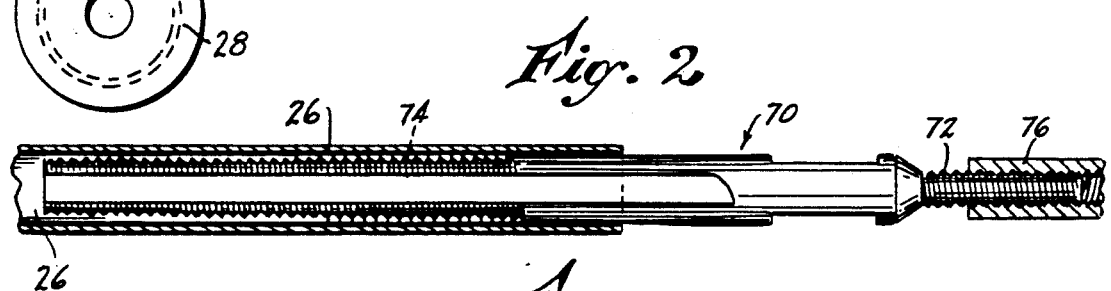
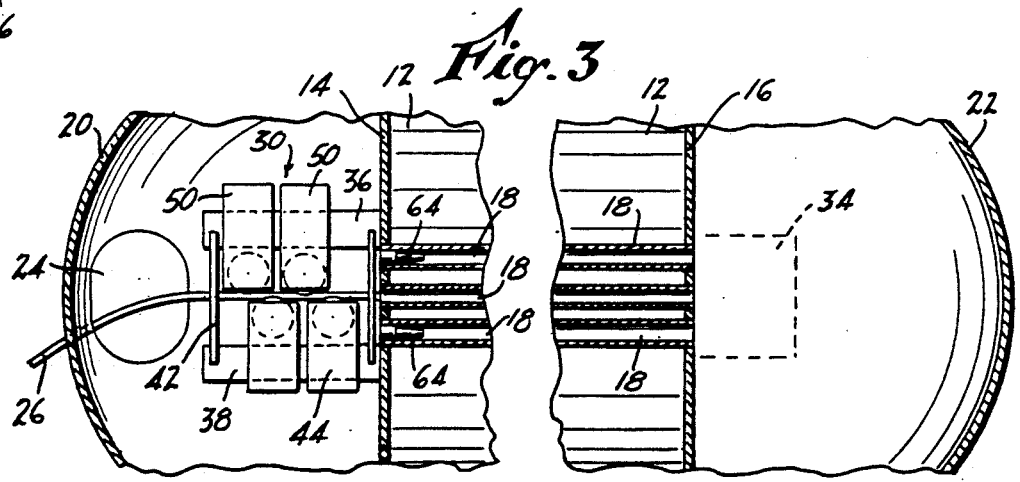
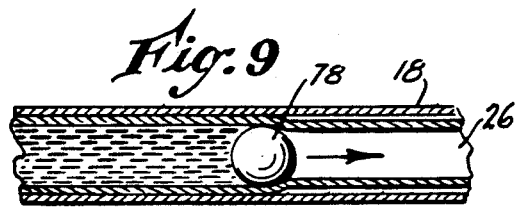
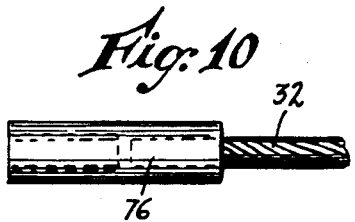

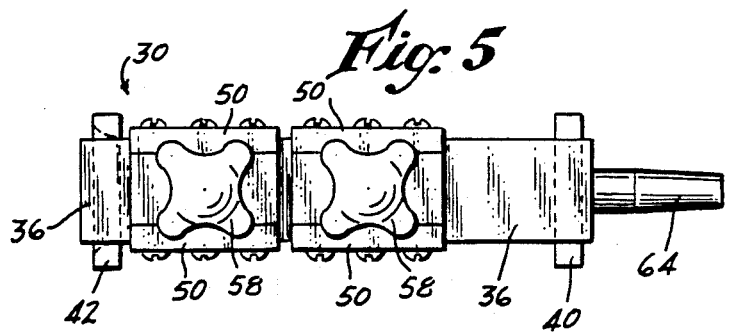
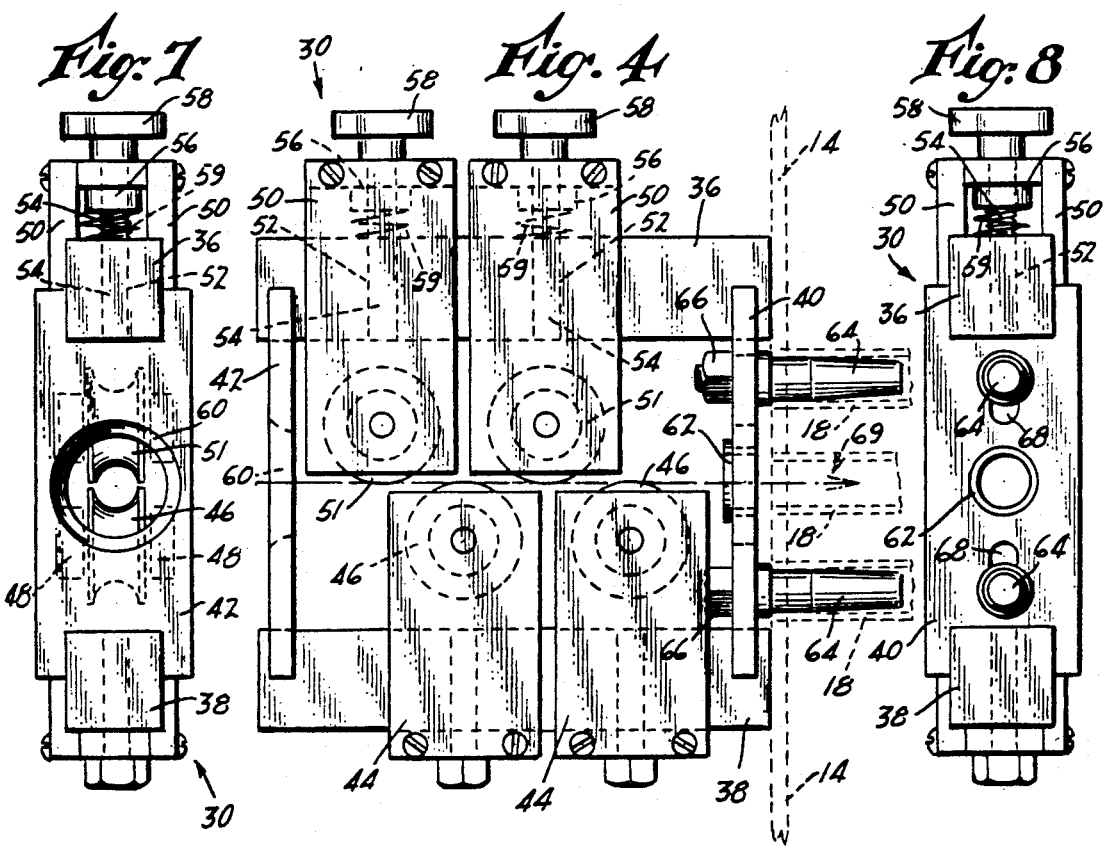
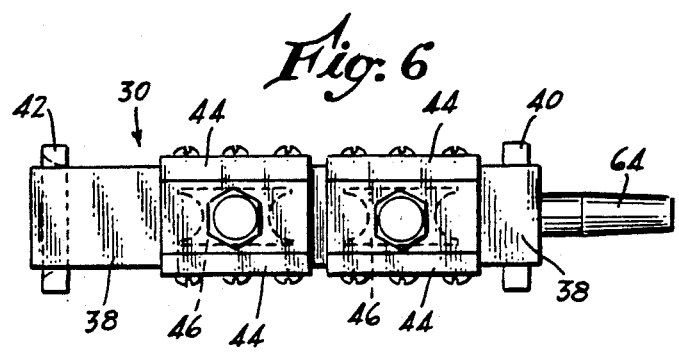

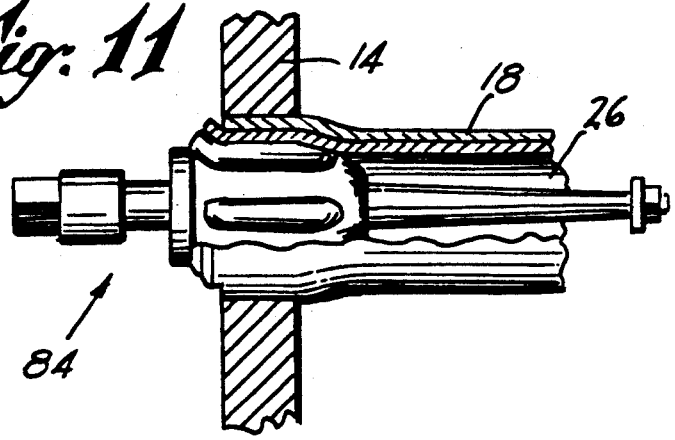
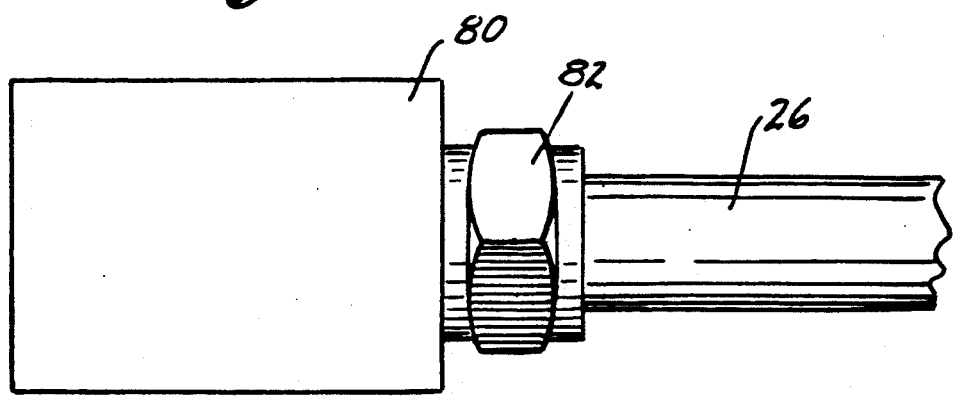

PROCESS FOR REPAIRING HEAT-EXCHANGER TUBES

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates generally to the repair of heat-exchangers, and more particularly to the restoration of individual tubes of such exchangers. Exchangers of the type to which this invention pertains are routinely employed on ships and submarines, also by commercial utility companies in connection with the generation of electrical power, and in oil and chemical refineries, as well as water de-salinization plants.

In particular, the invention addresses the problem of restoration of complete lengths of individual tubes extending between two oppositely-disposed tube sheets of a heat-exchanger or condenser unit.

2. Description of the Related Art Including Information Disclosed Under 37 CFR §§1.97–199

Heat-exchanger tubes which are subjected to wear and corrosion over extended periods of use eventually develop stress-related cracks or areas of weakness in the tube walls. Over the years, it has been discovered that a large majority of such failures occurs within the first three to six inches of the end of the tube. Such failures are thought to result from water turbulence which is present when high-velocity cooling water that is laden with chemical impurities and air/gas bubbles for cibly impinges on the wall surfaces adjacent the inlets of the tubes. The nature of the damage is both physical (abrasion and cavitation), and electro-chemical (including galvanic attack)

An example of a prior method of restoration of worn tubes is illustrated and described in applicant's U.S. Pat. No. 4,941,512 dated Jul. 17, 1990 and entitled METHOD OF REPAIRING HEAT EXCHANGER TUBE ENDS. This patent discloses the use of a tubular insert or liner which is placed inside the eroded end section of the exchanger tube to be repaired The liner is then forcibly expanded into intimate physical and heat-exchanging contact with the damaged wall of the tube, thus restoring the end section to a useable condition. Preferably the liner is then flared at its outermost end, to simulate the original tube configuration at the location of its joint with the tube sheet.

U.S. Pat Nos. 1,937,600; 2,157,107; and U.S. Pat. No. 3,317,222 disclose various arrangements involving protective tubular liner inserts which are intended to minimize the long-term destructive effects of corrosion and wear. In each case a reinforcing sleeve is fitted inside the respective end of the exchanger tube.

U.S. Pats Nos. 3,781,966; 3,962,767; 4,505,017; and U.S. Pat. No. 4,637,436 disclose methods of repairing worn end sections of heat exchanger tubes. In particular, U.S. Pat. No. '966 involves the use of explosively expanded sleeves, preferably inner and outer sleeves which are expanded into tight engagement with one another and with the inner surface of the worn exchanger tube. U.S. Pat. No. '767 discloses severing the worn tube and welding a sleeve inside such tube at the location where the severing occurred. U.S. Pat. No. '017 illustrates the use of a sleeve insert which is expanded to form a bulge that in turn causes a similar bulge in the exchanger tube wall, followed by a forcible shifting of the insert inwardly to form a seal between the outer surface of the insert and the inner surface of the exchanger tube wall. U.S. Pat. No. '436 employs a heat responsive expandable driver constituted of a shape-memory alloy, which effects expansion of a tube liner into firm engagement with the inner surface of an exchanger tube.

Finally, U.S. Pat. No. 4,694,549 illustrates and describes a procedure for replacement of an end section of an exchanger tube by cutting out a portion of the tube and replacing it with a tube liner piece that interfits with the existing tube end, expanding the new tube piece into engagement with the opening in the tube sheet and thereafter expanding the inner end of the tube piece into engagement with the walls of the existing tube end. The inner end of the tube piece is then welded to the existing tube end, and the outer end of the tube piece is welded to the tube sheet.

While some of the methods and apparati noted above have met with commercial success, the use of inserts for repairing existing tubes has certain limitations. In particular, where liners are pressed into place there arises a question of the integrity of the resulting joint. It is considered essential that the repaired tubes have the high reliability characteristics of a new tube, and be capable of prolonged operation under the relatively harsh conditions to which they are subjected when the exchanger is returned to service. In the event one or more repaired joints prove to be faulty, the exchanger often needs to be completely shut down, and the leaky tube either re-repaired or else plugged at the tube sheet. Plugging, while not considered all that objectionable when applied to a few tubes, does become a consideration when the number of plugged tubes increases. A plugged tube is completely inoperative from the standpoint of heat exchange; thus, a condition where a large number of tubes is plugged has the effect of significantly reducing the overall efficiency of the exchanger.

In addition, where welds are employed in conjunction with inserts or liners, the same question of integrity of the joint arises, namely is the weld adequate to withstand subsequent operation of the exchanger over prolonged periods, without premature breakdown or failure?

Finally, where the condition of an individual tube has deteriorated to the extent that little or none of the remaining tube is viable, restoration by means of end liners or inserts is not possible since this type of repair is applicable to only the end sections of such tubes.

Typical heat exchangers can contain hundreds of individual tubes ranging in lengths of up to 50 feet or more. In practice, replacement of entire tubes has been most difficult to achieve because usually there is not adequate space outside the exchanger in which to position a straight section of replacement tube and pass it through the original tube. This space limitation is especially severe in marine environments, such as on steamships or submarines. In general, complete replacement of individual tubes has not been possible in such cases; failures in individual tubes were handled by installation of tube liners as noted above, or alternately the entire tube was plugged (and thus taken out of service) in the event that a suitable repair by means of inserts or liners was not possible.

SUMMARY OF THE INVENTION

The above disadvantages and drawbacks of prior methods and arrangements for restoration of heat exchanger tubes are largely obviated by the present invention, which has for one object the provision of a novel and improved method for restoration of heat exchanger tubes substantially along their entire lengths, which method can be readily carried out without requiring disassembly of the exchanger unit per se, and can be practiced with a minimum of special equipment.

A related object of the invention is to provide a novel and improved method for restoration of heat exchanger tubes as above characterized, which is especially adaptable for use in cramped or crowded areas, and where space limitations dictate that work be performed in relatively close quarters.

Still another object of the invention is to provide an improved method of restoring the tubes of heat exchangers as outlined above, which is highly reliable in practice, and which and verified with a good degree of certainty, following completion.

Yet another object of the invention is to provide an improved method of restoring the tubes of heat exchangers in accordance with the foregoing, wherein the equipment involved with the repair can be located inside the water box of an exchanger, and where the personnel performing the repair can access the equipment from inside the water box, thereby often eliminating the need for removal of the box during the repair procedure.

A still further object of the invention is to provide an improved method as above set forth, which can be readily adapted for use with heat exchangers of widely varying dimensions and configurations, substantially without modification of either the steps involved or the equipment needed.

Yet another object of the invention is to provide an improved method as above described, wherein liner stock stored in coil form as on a spool, can be withdrawn therefrom as a continuous length and applied to a tube-straightening fixture for direct feed into and through an existing heat exchanger tube, and thereafter expanded therein and cut to length, so as to constitute a complete re-lining of the entire exchanger tube, from one tube sheet to the opposite tube sheet.

An additional object of the invention is to provide an improved tube-straightening fixture especially adapted for use with heat exchanger tube sheets and which accepts coiled stock from a spool, straightens it, and immediately thereafter feeds it to a pull-through device in such a manner that it can be fished through the existing tube to be re-lined, expanded therein into firm physical and heat-exchanging contact therewith, and cut to length so as to be flush with the respective tube sheet, sheet.

Still another object of the invention is to provide an improved tube-straightening fixture in accordance with the foregoing, which is both simple in its structure and operation, and which, following straightening of the coiled liner stock, automatically precisely positions the straightened stock in axial alignment with the exchanger tube being re-lined, thus minimizing possible problems with operator-related errors involving sightings and adjustments of the liner as it is inserted into the heat exchanger tube.

The above objects are accomplished by a novel method of repairing a heat-exchanger of the type having tube sheets in which the extremities of exchanger tubes are mounted, which comprises the steps of unrolling tubular insert stock from a supply roll, straightening the unrolled insert stock by passing it through a straightening fixture which has its output disposed substantially in alignment with one of the exchanger tubes at a location adjacent the extremity of the exchanger tube, pulling the straightened insert stock into and through the exchanger tube, and cutting off the pulled-in insert stock to a suitable length. Thereafter, the method comprises the steps of radially expanding the pulled-in insert stock against the inner walls of the exchanger tube, and sealing the extremities of the pulled-in insert to the tube sheets.

The objects are further accomplished by a novel and improved tube-straightening fixture for tubular stock, having means for guiding the stock toward an aperture in a multi-aperture heat exchanger tube sheet and into a heat exchanger tube connected therewith and which is to be refurbished, such heat exchanger having multiple coextensive heat exchanger tubes carried by the tube sheet The present improved fixture has a substantially rigid frame and a series of rollers arranged to selectively engage and straighten the tubular stock, and to thereafter feed it along a predetermined line of travel, into the one aperture. The frame further has a pair of spaced-apart positioning projections adapted to be received respectively in two of the adjacent tube sheet apertures, for positioning the frame with respect to the heat exchanger tube sheet so that the line of travel of the replenishing tubular stock is substantially coincidental with the axis of the one heat exchanger tube being restored.

The tube-straightening fixture is especially adapted for use with heat exchangers located in cramped areas where there is insufficient room to operate with long, straight lengths of liner tubing. Such is likely the case with most steamship and submarine units currently in use.

With the tube-straightening fixture of the present invention, liner tubing of extended length can be carried on a spool and de-reeled as necessary, straightened, and cut to its desired length after the liner is installed in the existing heat exchanger tube. The entire length of the heat exchanger tube is thus capable of being lined and restored almost to the condition of a new tube.

Other important features and advantages of the invention will hereinafter appear.

BRIEF DESCRIPTION OF THE DRAWINGS

In the drawings, illustrating the method and apparatus of the invention:

FIG. 1 is a view, partly in side elevation and partly in axial vertical section, of a typical heat exchanger having oppositely disposed planar tube sheets and a plurality of heat exchanger tubes extending therebetween, illustrating a spool containing a coil of liner stock adapted for permanent installation in a heat exchanger tube to be refurbished FIG. 2 is a axial section of a piece of liner tubing, and a threaded tool constituting a tube pull or spear device inserted in the tubing and connected with a pull cable.

FIG. 3 is a horizontal section taken on the line 3—3 of FIG. 1.

FIG. 4 is a plan view of a tube-straightening fixture employed in carrying out the method of the present invention, illustrating the application of the fixture onto a tube sheet, such tube sheet and exchanger tubes being illustrated in dotted outline.

FIG. 5 is a far side elevational view of the fixture of FIG. 4.

FIG. 6 is a near side elevational view of the fixture of FIGS. 4 and 5.

FIG. 7 is a rear end elevation of the fixture of FIGS. 4-6.

FIG. 8 is a front end elevation of the fixture of FIGS. 4-7.

FIG. 9 is a fragmentary section of a heat exchanger tube with inserted tube liner, illustrating an expander ball being hydraulically driven as by water, through the tube liner so as to expand it into engagement with the inner surface of the heat exchanger tube.

FIG. 10 is a side view of a cable employed with the tube pull or spear device of FIG. 2, the cable being attachable to a winch located at the right hand tube sheet in FIGS. 1 and 3, such winch being in dotted outline in these figures.

FIG. 11 an ax section of a tube sheet, exchanger tube and liner inserted therein, after the liner has been expanded as in the step of FIG. 9, and showing an additional expansion and flaring of the liner and exchanger tube at the tube sheet by means of a powered expander tool, and FIG. 12 is a partly diagrammatic view of a hydraulic pump and pressure line connected to the liner tube. The pump supplies pressurized fluid such as water to the liner tube, to forcibly drive the expander ball in the direction of the arrow in FIG. 9.

DESCRIPTION OF THE PREFERRED EMBODIMENT

Referring first to FIGS. 1 and 3 there is illustrated a typical heat exchanger generally designated by the numeral 10, comprising a large tubular body 12 having an annular wall and a pair of apertured tube sheets 14, 16 which are oppositely disposed and which face one another. Extending between the tube sheets is a plurality of heat exchanger tubes 18 that are mounted thereon. The apertures of the tube sheets 14, 16 accommodate the opposite extremities of the tubes 18 in sealing fashion, all in the usual manner.

Disposed at the ends of the body 12 are semi-spherical casings constituting water boxes 20, 22, the left water box 20 showing an access opening or man hole 24 normally spanned by an access cover (not shown). In practice, cooling water flows into one water box 20, through the heat exchanger tubes 18 and into the other water box 22, and is drawn off therefrom. The steam being condensed is introduced into the chamber formed by the body 12 and the tube sheets 14, 16, and the condensate is removed through an outlet conduit (not shown) connected therewith.

FIG. 3 is a horizontal sectional view of the heat exchanger 10. Three only of the heat exchanger tubes 18 are illustrated in section. In the following discussion it is assumed that the center heat exchanger tube 18 in this figure has deteriorated, and is to be restored in accordance with the methods of the present invention.

As noted above, circulating water which impinges on the inner wall surfaces of the heat exchanger tubes 18 eventually causes them to wear, both by physical erosion/abrasion and by electro-chemical reaction. In the case where salt water is employed as the coolant, the corrosive effect of the salt solution contributes significantly to the damage that occurs chemically. Dissolved or suspended impurities in the water are responsible for much of the physical erosion/abrasion of the metal surfaces of the heat exchanger tubes 18.

Referring to FIGS. 1-3 and in accordance with the present invention there is provided a novel and improved method for restoration of the entire length of a heat exchanger tube 18, by introduction of a length of tube liner stock 26 into the heat exchanger tube 18 from a continuous roll of stock 26 carried in coil form on a supply roll or spool 28. In carrying out the method, the stock 26 is uncoiled and fed through a special tube-straightening device or tube-straightening fixture 30 to be described below, and the free end of the stock 26 fished through the heat exchanger tube 18 by a pull line or cable 32, FIGS. 1 and 10, connected to a winch 34, FIGS. 1, 3, which is disposed at the opposite end of the heat exchanger tube 18. The liner stock 26 is pulled through the entire length of the heat exchanger tube 18 until it extends a short distance beyond the opposite end thereof Referring now to FIGS. 4-8, the novel tube-straightening fixture of the invention designated 30 comprises a substantially rectangular frame preferably constituted of aluminum, the frame having two oppositely disposed parallel bars 36, 38 shown as being of square cross section, and having oppositely disposed inner and outer frame members 40, 42, respectively constituted of flat bar stock. The frame members are slotted to receive the parallel bars 36, 38, and the parts are welded together to form a rigid structure.

Fixedly carried by the lower parallel bar 38 in FIG. 4 are mounting blocks 44 for grooved rollers 46. The periphery of each roller has a configuration as shown in dotted outline in FIG. 7, to comfortably accommodate the particular gauge of liner stock to be straightened, as will be described below. Each roller is free-turning on bearings, indicated 48. The mounting blocks 44 are secured to the bar 38 by screws as shown.

An example of a typical heat exchanger tube is an 18 gauge 1 inch 0. D. tube with a wall thickness of 0.049 inches. The I. D. is 0.902 inches. The 0. D. of the liner stock 26 to be employed would preferably be 0.875 inches.

Also, in accordance with the invention there is provided a pair of slider blocks 50 adjustably carried on the upper one 36 of the parallel bars 36, 38, each slider block 50 in turn carrying a free-wheeling grooved roller 51 similar in configuration to those designated 46. The slider blocks 50 are each offset laterally, left to right, from the positions of the mounting blocks 44 for the rollers 46, such that the liner stock 26 is first engaged by one of the rollers 51, then by the remaining rollers 46, 51, 46 in succession. The upper bar 36 has two threaded bores 52, and adjustment screws 54 are carried in the slider blocks 50, and restrained against axial movement by locking collars 56. The screws are received in the threaded bores 52. Knobs 58 are secured to the adjustment screws 54, to enable them to be manually turned, whereby the rollers 51 can be advanced toward or retracted away from the rollers 46, as needed in order to properly guide the liner stock 26. Compression springs 59 carried by the screws 54 bear against the upper one 36 of the parallel bars and the slider blocks 50, biasing the latter and eliminating any tendency for the screws 54 to rotate by themselves during handling or positioning of the tube-straightening frame 30 on the tube sheet 14.

In FIGS. 4 and 7, the outer frame member 42 has an inlet guide opening or aperture 60 the walls of which are preferably beveled to readily accept the liner stock 26 from the supply carried on the spool 28, FIG. 1. The inner frame member 40 has an aperture preferably fitted with a bushing 62 of relatively soft material, such as nylon or plastic, constituting an outlet through which the stock passes after is has been straightened by the rollers 46 and 51.

Further, by the invention, the inner frame member 40 is provided with positioning means in the form of pilot pins or projections 64, preferably having tapered nose portions, and cylindrical body portions. Two such pins 62 are illustrated in FIGS. 4 and 8. The inner ends of the pins are threaded, and secured to the inner frame member 40 by nuts 66. The frame member has elongate adjustment slots 68, FIG. 8, to enable the positions of the pins 64 to be adjusted with respect to the tubes 18 in the tube sheet 14 and with respect to the bushing.

By the disclosed arrangement, coiled stock 26 from the spool 28 can be de-reeled and manually fed to the fixture 30, through the fixture's opening 60, past the rollers 51, 46, 51, 46 in succession, during which pass the stock is straightened, and pass out through the bushing 62. An important feature of the fixture of the present invention resides in the relative disposition of the following elements: (1) the rollers 46, 51; (2) the aperture 60; and (3) the bushing 62 with respect to the axis of the heat exchanger tube 18 to be restored. Specifically, the aperture 60 and bushing 62 are in axial alignment with the exchanger tube 18 to be lined, such that the straightened stock 26 can be pulled directly through the bushing 62 and in a straight line through the entire length of the exchanger tube 18. In accomplishing a precise positioning of the frame with respect to the tube sheet, the pins 62 can be adjusted as necessary to establish the alignment between the bushing 62 and the axis of the heat exchanger tube 18, and the adjusted positions thereafter fixed by tightening the nuts 66. The stock is thus pulled along a line of travel 69 that is coincidental with the center of aperture 60 and bushing 46.

By the invention, the cylindrical body portions of the pins 64 are of size which provides a press fit with the bores of the particular exchanger tubes 18 adjacent that one being repaired. Hence, the entire frame 36, 38, 40, 42 can be manually aligned with the tube 18 to be restored, with the pins 64 aligned with the axes of adjacent tubes 18, and the frame mounted in position against the tube sheet 14 in the manner of FIG. 4. The two pins 64 are snugly received in the two corresponding tubes 18, and the frame remains in this position until it is manually removed, after the liner tube 26 is pulled completely through the exchanger tube 18 being lined.

More particularly the method of the invention includes the following steps, in carrying out the complete restoration of the entire length of a heat exchanger tube 18. Preferably the tube is inspected through its inlet in order to determine the extent of the deterioration; any loose material or residue clinging to the inner surface of the tube is removed as much as possible in order to provide a relatively clean, bare metal surface.

The winch 34, indicated in dotted outline in FIGS. 1 and 3, is temporarily mounted t the tube sheet 16. The cable 32 of the winch 34 is fished through the heat exchanger tube 18 manually and its end pulled into the chamber formed by the water box 20. The tube-straightening fixture 30 shown in FIGS. 4–8 is then mounted on the tube sheet 14, with the outlet bushing 62 in axial alignment with the heat exchanger tube. The winch cable 32 is fed backwards through the tube-straightening fixture 30, passing through the guide aperture 60 thereof, and attached to what I term a "tube-pulling spear" 70, shown particularly in FIG. 2. The spear 70 has a uniform thread 72 at one end, and at its other end a tapered cutting thread 74 of a size which is adapted to be inserted in the free end of the stock 26. When the spear 70 is "threaded" into the end of the stock 26, the tread 74 of the spear cuts into its inner surface and becomes firmly attached thereto. The winch cable 32 terminates in a connector 76, FIG. 10, having a bore with internal threads which accept the uniformly threaded portion 72 of the spear 70.

Following attachment of the spear 78 to the free end of the stock 26, the latter is initially manually fed through the aperture 60 of coil-straightening fixture 30, as in FIGS. 1 and 3, in order to effect the straightening procedure. With the stock in position ready to be pulled past the rollers 51, 46, 51, and 46, the winch can be energized so as to forcibly draw the end of the liner stock through the bushing 62, into the left end of the heat exchanger tube 18 and through its entire length. Thereafter the lead end of the stock emerges at the right end of the heat exchanger tube 18. This step involving pulling the liner stock 26 completely through the heat exchanger tube 18 normally requires a winch because of the relatively long length of liner stock being drawn through the heat exchanger tube, and the frictional engagement between the liner stock and the inner surface of the heat exchanger tube. The pull cable 32 is shown in dotted outline in FIG. 1.

After the liner 26 is pulled completely through the heat exchanger tube in this manner, the remaining stock 26 is severed from the inserted liner, usually at a distance of several feet from its point of entry into the tube-straightening fixture 30, and the fixture 30 removed from the tube sheet 14 and from the water box 20.

Referring to FIGS. 9 and 12, following insertion of the liner stock 26, an expander ball 78 having a diameter of typically 0.848–0.850 inch, is inserted in the end of the liner stock 26 which has been enlarged for this purpose, and the stock 26 is then connected to a hydraulic pump 80, FIG. 12, by a suitable hydraulic coupling 82. Water under pressure, typically 10,000 PSI, furnished by the pump 80, is sufficient to drive the expander ball 78 through the liner 26 and out the opposite end. As the ball 78 travel along the entire length of the liner, it radially expands the liner into engagement with the inner surface of the wall of the original exchanger tube 18, FIG. 9, establishing a tight physical metal-to-metal contact therewith substantially along the entire length of the heat exchanger tube. The better the contact, the more efficient will the resulting heat exchange be. In practice, it has been determined that the re-lined exchanger tube can atain a heat transfer efficiency just slightly less than that of the original heat exchanger tube 18. This is considered significant when consideration is given to the alternative, i.e. complete plugging of a damaged tube 18, in which case the efficiency for that tube becomes essentially zero.

Following expansion of the liner 26, the opposite ends are trimmed to length to be approximately flush with the respective tube sheet 14, 16. The end of the liner is then forcibly expanded further, into engagement with the end surface of the heat exchanger tube expander 84, shown in FIG. 11. Then the end of the liner adjacent the tube sheet 16 is similarly forcibly expanded. Depending on the configuration f the original heat exchanger tubes, this expander can impart a flare configuration to the liner which substantially duplicates the configuration of the heat exchanger tube itself. A roller-type expander tool similar to that known as a 1500 Series or 3000 Series Weideke tube expander is preferably used, the 1500 Series being shown in FIG. 11 and designated 84. Alternately and if desired, in place of a flare, the liner can be cut off substantially flush with the tube sheet by a suitable milling tool.

Optionally, corrosion resistant coatings can be applied to the repaired tube and surrounding area of the tube sheet, thereby minimizing attack by the cooling water to be subsequently applied, and extending the life of the repaired tube.

From the above it can be seen that I have provided a novel and improved method and apparatus for the restoration of a complete length of a heat exchanger tube, the method being especially simple and straightforward to practice, and capable of being carried out from locations exterior of the tube sheets. With large heat exchangers having access openings, there is no need to remove the waver box. Repair technicians and/or workmen can enter the water box itself if necessary, through the access opening or hatch 24, position the tube-straightening fixture 30 and perform the steps outlined above involving insertion of the tube liner 26. The provision of coiled stock in conjunction with a straightening fixture enables the present method to be used in cases where there are severe space limitations. Prior to the present invention, it was often either impossible, or else considered impractical to re-line the entire length of a heat exchanger tube without disassembling the entire heat exchanger body. This usually means removing the original unit and substituting a new one. In such cases the old unit was either scrapped, or shipped back to a repair facility, for renovation.

The restoration of a heat exchanger tube in accordance with the invention and as described above has the distinct advantage tat there result only two joints in the repaired unit, namely: (1) the juncture of the liner tube, original heat exchanger tube 18 and tube sheet 14; and (2) the juncture of the liner tube, original heat exchanger tube 18 and tube sheet 16. Thus the integrity of the two connections is easily determined, since the location of the joints coincides with the outer surface of each tube sheet, and it is not necessary to inspect the interior of the completed liner insert for potential leaks, possible poor press fits, insufficient welds, etc.

The method of the invention is in distinct contrast to many of the arrangements of the prior art involving the use of end liners, where there existed a joint or seam at each of the opposite ends of a liner insert. In the case of a heat exchanger tube which was re-lined at both ends, a total of four connections or seams was involved. Also, where end liner inserts were employed, any wear or damage to the inner portion of the heat exchanger tube was for the most part not addressed, and the possibility of failure of these intermediate areas during subsequent operation was increased, compared to that resulting from a complete re-lining of the entire length of the tube and as provided for by the present invention.

The disclosed method and apparatus are thus seen to represent a distinct advance and improvement in the field of heat exchanger repair and restoration.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. The method of repairing a heat-exchanger of the type having a pair of spaced-apart tube sheets in which the respective extremities of exchanger tubes are mounted, which comprises the steps of unrolling tubular insert stock from a supply roll of the same, straightening the unrolled insert stock by passing it through a straightening device which has its output disposed substantially in alignment with one of said exchanger tubes at a location adjacent the mounted extremity of said exchanger tube, pulling the straightened insert stock into and entirely through said one exchanger tube so as to exit at the opposite end of the tube, cutting off the pulled-through insert stock at both of said tube sheets, radially expanding said pulled-through insert stock against the inner wall surface of said one exchanger tube at both ends thereof, and sealing the extremities of the pulled-through insert stock to the said tube sheets.

2. The method as set forth in claim 1, and including the further step of passing a pull-line through said one exchanger tube and securing the same to the end of the tubular insert stock prior to and in preparation for pulling the insert stock through the exchanger tube.

3. The method as set forth in claim 1, and including the further step of positioning the straightening device against the tube sheet prior to passing the insert stock through the exchanger tube.

4. The method as set forth in claim 1, wherein the straightening device has a series of rollers which engage and bend the insert stock, and including the further step of passing the insert stock between said rollers in the straightening device to straighten the stock.

5. The method as set forth in claim 3, wherein the heat exchanger is of the type having a water box which encloses the tube sheet and tube extremities, said method including the further step of passing the tubular insert stock through an opening of the water box to the said straightening device.

6. The method as set forth in claim 3, and including the further step of manually guiding the liner stock at locations up-stream of the straightening device.

7. The method of claim 1, and including the additional step of fishing a pull wire through said one exchanger tube from the end thereof which is opposite to the location of the straightening device, and attaching the wire to the insert stock in order to pull it through said one exchanger tube.

8. The method of claim 7, wherein the pull wire has a tapered tube-engaging fitting at one end, and including the additional step of forcing the tapered tube-engaging fitting into the end of the liner stock, so as to secure the stock in readiness to pull the pull wire.

9. The method of claim 7, wherein the pull wire has a tapered threaded tube-engaging fitting at one end, and including the additional step of threading the tapered tube-engaging fitting into the end of the of the liner stock, so as to secure the stock in readiness to pull the pull wire.

10. The method of claim 7, wherein the step of pulling the straightened liner stock through the said one exchanger tube urges the straightening device into tight engagement with the tube sheet at said location.

11. The method of claim 7, wherein there is a power winch located at the tube sheet adjacent said opposite end of the exchanger tube, and wherein the pull wire is connected to the power winch to forcibly pull the pull wire and liner stock through the said one exchanger tube.

12. The method of claim 1, wherein the liner stock is installed in the exchanger tube substantially through its entire length, from one tube sheet to the other.

13. The method of claim 1, and including the additional step of radially expanding said insert stock against and into firm engagement with the inner surface of said one exchanger tube substantially completely along the entire length of the exchanger tube.

14. The method of repairing a heat exchanger of the type having a tube sheet in which the extremities of exchanger tubes are mounted, and wherein one exchanger tube is to be re-lined, said exchanger having a water box which encloses the tube sheet and tube extremities, said water box having a man-hole to provide for access to its interior, and said method employing a tube straightening fixture having a frame with an output port and a pair of spaced apart adjustable positioning projections carried by said frame and adapted to be received respectively in two of said extremities of said exchanger tubes, which method comprises the steps of adjusting the positions of both of said projections with respect to said frame so as to enable the projections to align with and be inserted respectively into two of said extremities that are adjacent the exchanger tube being re-lined while positioning the frame with respect to the tube sheet so that the output port of the tube straightening fixture frame is in axial alignment with the tube being re-lined, passing tubular insert stock through said man-hole from a supply roll of said stock which is located outside of the water box, straightening the thus passed-through stock by passing it into said straightening device and out through the output port of the tube straightening fixture frame and into said one exchanger tube, pulling the insert stock completely through the exchanger tube, cutting off the pulled-through insert stock at said tube sheet, radially expanding said pulled-through insert stock against the inner walls of the exchanger tube, and sealing the extremity of the pulled-through insert stock to the tube sheet.

15. The method as set forth in claim 14, wherein:
(a) the steps of expanding and sealing the insert stock are accomplished simultaneously by use of a roller-type tube expander.

16. The method as set forth in claim 14, wherein:
(a) the steps of expanding and sealing the insert stock are accomplished simultaneously.

17. The method as set forth in claim 1, wherein the sealing of the extremities of the insert stock comprises the step of trimming the extremities of the insert stock and thereafter flaring outward the trimmed extremities of the insert stock against the tube sheets, respectively.

18. The method as set forth in claim 1, wherein the straightening device has a pair of pilot positioning pins substantially coextensive with and spaced from one another, and including the further step of placing the straightening device against the tube sheet at said location with the positioning pins inserted respectively in heat-exchanger tubes which are near said one tube being repaired, so as to precisely position the straightening device on the tube sheet at said location with the said output of the straightening device substantially aligned with said one tube.

* * * * *